United States Patent [19]

Köhnen et al.

[11] Patent Number: 4,893,912
[45] Date of Patent: Jan. 16, 1990

[54] DEVICE FOR OBSERVING A HOT REACTION SPACE IN THE INTERIOR OF A REACTOR OPERATING AT INCREASED PRESSURE

[75] Inventors: Klaus Köhnen, Mühlheim/Ruhr; Hans Niermann; Lothar Semrau, both of Essen, all of Fed. Rep. of Germany

[73] Assignee: Krupp Koppers GmbH, Essen, Fed. Rep. of Germany

[21] Appl. No.: 796,391

[22] Filed: Nov. 7, 1985

[30] Foreign Application Priority Data

Nov. 13, 1984 [DE] Fed. Rep. of Germany ....... 3431346

[51] Int. Cl.$^4$ .............................................. G02B 23/08
[52] U.S. Cl. ..................... 350/506; 350/584; 73/324; 73/327; 73/333
[58] Field of Search ................... 422/54, 55, 112, 113, 422/119; 350/506, 538, 541, 584; 250/564, 554, 576, 398; 356/434, 435, 436, 437; 374/130, 131, 139; 73/323, 324, 327, 332, 333; 122/504, 504.2

[56] References Cited

U.S. PATENT DOCUMENTS

| | | | |
|---|---|---|---|
| 2,959,090 | 11/1960 | Davies | 350/584 |
| 3,146,822 | 9/1964 | Ray | 250/554 |
| 3,229,577 | 1/1966 | Ellinger | 350/506 |
| 3,423,145 | 1/1969 | Breitengross | 350/506 |
| 3,897,139 | 7/1975 | Caruolo et al. | 350/633 |
| 4,179,530 | 12/1979 | Köppl et al. | 437/233 |
| 4,497,550 | 2/1985 | Ouchi et al. | 250/584 |
| 4,541,277 | 9/1985 | Starnes, Jr. | 73/324 |
| 4,648,692 | 3/1987 | Kinoshita | 350/633 |
| 4,678,290 | 7/1987 | Welker | 350/506 |

Primary Examiner—David L. Lacey
Assistant Examiner—Gregory R. Muir
Attorney, Agent, or Firm—Michael J. Striker

[57] ABSTRACT

A tubular housing is provided at one end thereof with a protective glass prism facing an observation opening in a pressurized reactor. The other end of the housing is closed and the intermediate part thereof supports an inclined mirror. A viewing tubular piece is arranged transversely to the tubular housing to receive light rays reflected from the mirror. The free end of the viewing piece is also provided with a protective glass prism.

3 Claims, 2 Drawing Sheets

DEVICE FOR OBSERVING A HOT REACTION SPACE IN THE INTERIOR OF A REACTOR OPERATING AT INCREASED PRESSURE

BACKGROUND OF THE INVENTION

This invention relates in general to a device for viewing the interior of reactors operating at high temperatures and pressures.

In hot reaction spaces, for example in reactors for gasification of finely divided solid particles floating in a gas stream, it is frequently necessary to keep under observation the definition, color and size of flames as well as under certain circumstances the resulting liquid or solid slag. When the gas generator is operated under an increased pressure for example at 30 bar or more, then the observation device which in this case is exposed not only to high temperatures present in the gas generator but also to high pressures, must guarantee a reliable seal of the inner space of the generator against outer atmosphere. In addition, the observation device must guarantee that under any circumstances in the case of a breakage of the glass prism exposed to high loads no injury is caused to the observer.

SUMMARY OF THE INVENTION

It is therefore a general object of the present invention to provide an observation device which reliably meets the beforementioned requirements.

In keeping with these objects and others which will become apparent hereinafter, one feature of the invention resides, in a combination which includes a tubular housing having an inlet portion communicating with an observation opening in the reactor and an intermediate portion provided with a reflecting mirror inclined at an angle to light rays passing through the opening, a transverse tubular viewing piece communicating at one end thereof with the intermediate portion opposite the inclined mirror to receive the reflected light rays, a first glass prism sealingly mounted in the inner portion to separate the intermediate portion from the pressurized interior of the reactor, and another glass prism sealingly mounted at the other end of the viewing piece. In the preferred embodiment of this invention, the tubular viewing piece forms an angle of 90° to the axis of the observation opening.

The arrangement according to this invention guarantees that in the event of a destruction of the glass prism facing the pressurized hot space of the reactor, glass fragments cannot hit and break the other glass prism in the viewing tube and consequently no injury of the observer can occur.

According to a further elaboration of the device of this invention, the inclined position of the reflecting mirror is adjustable by an actuation device controlled outside the housing so that the observer can easily adjust the direction of observation.

Furthermore, in order to remove dust deposits from the side of the glass prism in the inlet portion facing the pressurized space, there is provided a rinsing nozzle leading to a source of gaseous rinsing medium.

In order to prevent condensation of vapors in the event that temperature in the housing drops below dew point, the housing is provided with heating means.

In a further elaboration of this invention, the housing is equipped with a pressure relieving tubular piece in which a safety plate is arranged. The safety plate is designed to rupture at a pressure which is less than the operational pressure of the gas reactor so that in case of a failure pressure in the housing cannot reach the level of the operational pressure. The pressure built up in this emergency condition is only momentary inasmuch according to another feature of this invention, a motor activated shut-off valve is provided in the observation channel leading to the observation opening. The shut-off valve closes in response to a signal from a converter leading to a pressure measuring apparatus connected to a pressure releasing conduit. In addition, the pressure releasing conduit is connected via a bypass conduit to the intermediate portion of the housing and an apertured diaphragm prevents pressure built up due to minor leakage in the housing.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
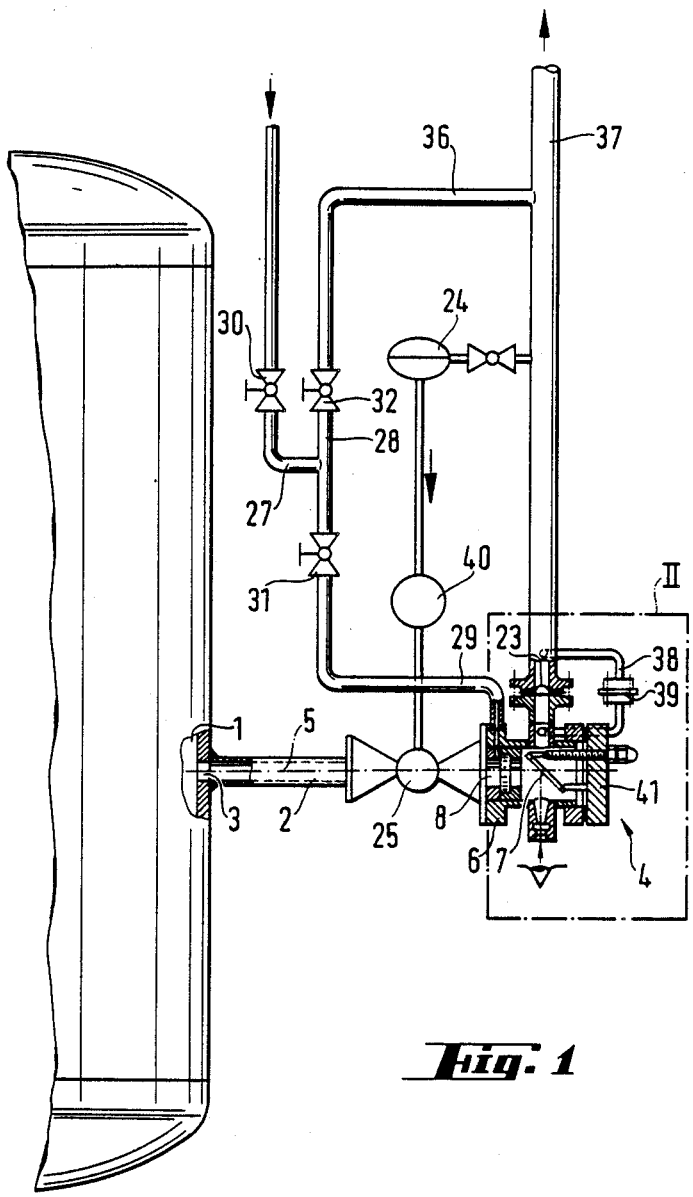
FIG. 1 shows schematically the arrangement of the observation device of this invention in connection with a hot reaction space.
Figure 2:
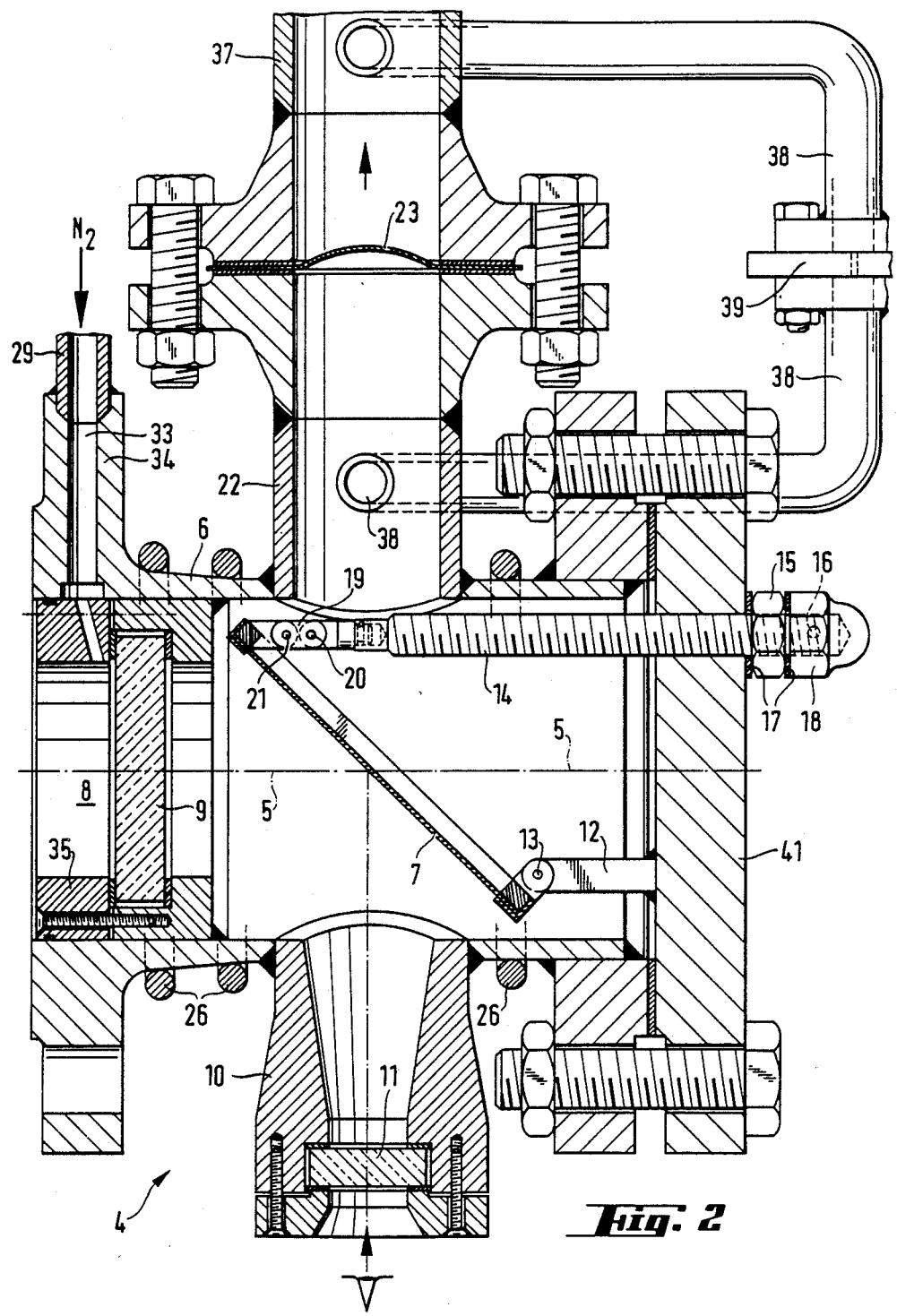
FIG. 2 is a sectional side view of an embodiment of the device of this invention.

In the Figures, reference numeral 1 indicates a hot reaction space of a reactor operating at an increased pressure. A tubular connection piece 2 is connected to an observation opening 3 leading to the reaction space and forms therewith an observation channel having an optical axis 5. The connection piece 2 communicates with an inlet portion of a tubular housing 6 whose intermediate part accommodates an inclined mirror 7. The rear part of the housing is closed by a cover 41.

The inlet portion of the housing is provided with a glass prism 9 which is sealingly inserted into a recess of rinsing ring 35 to separate the pressure space 8 from the intermediate part of the housing. A tubular viewing piece 10 is secured at right angles to a jacket of housing 6 and communicates with the intermediate part opposite the inclined mirror 7. The free end of the viewing piece is also provided with a protective glass prism 11. Hence, the observation of light rays emanating from the interior of the reactor and passing through the first glass prism 9, is performed at right angles to the optical axis 5 by means of the mirror 7 and the second protective glass prism 11.

The mirror can be adjusted to different angular positions to provide for observation from different directions. The adjusting means include a fixed support 12 welded to the inner wall of the cover 41 and provided at its free end with a hinge 13 secured to a lower edge of the mirror. Another support includes a spindle 14 passing through a threaded opening in the cover 41 and being attached to the upper edge of the mirror by joints 20 and 21. The projecting end of the spindle 14 is provided with a setting nut 18 attached to the spindle by a cross bar passing through an opening 16 and the spindle is held in an adjusted position by a nut 15. The threaded opening for the spindle is protected against outer atmosphere by sealing rings 17 at both ends of the nut 15.

As mentioned before, the reflection of the light rays from the interior of the reactor by the reflecting mirror 7 is provided for safety reasons inasmuch as the inlet glass prism 9 is exposed both to high temperatures and high pressures and consequently, considering such combined loads the possibility of destruction of the inlet glass prism 9 cannot be completely excluded. Due to the transverse arrangement of the viewing glass prism 11 whose viewing axis forms an angle of 90° to the axis 5 of observation, it is ensured that in the case of a breakage of the glass prism 9 the glass fragments are prevented from hitting and breaking the viewing prism 11. For this reason, it is of importance that the mirror 7 be designed in such a manner as to prevent acting as a segment reflector. Therefore the mirror is made of glass or thin metal foil which is broken by the impact of the glass fragments.

The intermediate part of housing 6 also communicates with a pressure relieving tubular piece 22 in which a safety plate 23 rupturing at a predetermined pressure is installed. This measure prevents in the event of destruction of prism 9 an excessive pressure increase in the housing 6 which might cause breakage of the viewing glass prism 11. This excessive pressure build up is limited to last only a short time until the shut off device 25 closes the observation channel 2. The shut off device 25 is controlled by a signal delivered from a converter 40 which is connected to a pressure measuring apparatus 24 communicating via pressure releasing conduit 37 with the outlet of the pressure relieving tubular piece 22.

To protect the device of this invention against impaired visibility which might be caused by condensation of vapors on mirror 7 and glass prisms 9 and 11, when temperature in the housing drops below dew point, there is provided an electric heating device 26 on the outer surface of housing 6. In addition, an amount of silica gel can be inserted in the housing 6 to remove moisture.

In order to keep clean the face of the glass prism 9 exposed to the interior of the reactor, the ring 35 is provided with a nozzle for directing a gaseous rinsing medium, preferably $N_2$ against the prism 9. The rinsing medium is supplied through conduits 27, 28 and 29 when valves 30 and 31 are open and valve 32 is closed. The rinsing gas is fed to the rinsing nozzle through a radial bore 33 in a mounting flange 34 surrounding the inlet end of the housing 6. The nozzle in the rinsing ring 35 is inclined against the face of the glass prism 9 so as to direct a sharp beam of gas thereon.

Alternatively, the rinsing system can be also used for relieving pressure from the space 8, when it is intended to dismount the housing 6 from the observation channel when the shut off valve 25 is closed. For this purpose shut-off valve 30 is closed whereas valves 31 and 32 are opened. Pressurized gas 8 can escape through the nozzle in ring 35, the bore 33, the conduits 29, 28 and 36 and finally through the pressure releasing conduit 37 into outer atmosphere. It is also advisable to pressure relieve the space 8 between the shut off device 25 and the glass prism 9 at the completion of each observation process, thus avoiding a continuous loading of the glass prism 9 with the pressure of the reaction space.

Another protective measure includes a venting conduit 38 provided with an apertured partition or an apertured diaphragm 39 bypassing the rupture plate 23. The aperture of the diaphragm prevents the build up of gas pressure within the housing 6 in the case of small leakages around the glass prism 9.

While the invention has been illustrated and described as embodied in a specific embodiment of visual observation device, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. A device for observing a hot reaction space in the interior of a reactor operating at an increased pressure, comprising: a tubular housing having an inlet portion for communicating with an observation opening in the reactor, an intermediate portion enclosing a reflecting mirror inclined at an angle to light rays passing through the observation opening, and a closed rear portion; a transverse tubular viewing piece communicating at one end thereof with the intermediate portion opposite said inclined reflecting mirror to receive the reflected light rays; a glass prism sealingly mounted in said inlet portion to separate said intermediate portion from the pressurized interior of the reactor; and another glass prism sealingly mounted at a second end axially opposite the end communicating with the intermediate portion of the tubular housing; and further comprising a transverse pressure relieving tubular piece communicating with said intermediate portion, and being provided with a rupture plate.

2. A device as defined in claim 1, further comprising a shut off device positioned adjacent to said glass prism in the inlet portion of the tubular housing, a pressure releasing conduit connecting said pressure relieving tubular piece with outer atmosphere, and a pressure measuring device communicating with said pressure releasing conduit and connected via a converter to said shut off device to deliver a control signal for closing the shut off device when pressure in the pressure releasing conduit exceeds a predetermined value.

3. A device as defined in claim 1, further comprising a venting conduit provided with an apertured diaphragm and connected to said pressure releasing conduit and said pressure relieving tubular piece, so as to bypass said rupture plate in the pressure relieving tubular piece to prevent a pressure build up in the intermediate and rear portions of the tubular housing in the case of minor leakage.

* * * * *